US012368737B1

(12) United States Patent
Liu et al.

(10) Patent No.: US 12,368,737 B1
(45) Date of Patent: Jul. 22, 2025

(54) METHOD AND SYSTEM FOR DETECTING ABNORMAL NODES IN INDUSTRIAL INTERNET, AND MEDIUM AND DEVICE

(71) Applicant: YANTAI UNIVERSITY, Yantai (CN)

(72) Inventors: Zhaowei Liu, Yantai (CN); Zhifei Lu, Yantai (CN); Rufei Gao, Yantai (CN); Xinxin Zhao, Yantai (CN); Wenhan Hou, Yantai (CN); Benquan Chen, Yantai (CN); Zhizhong Liu, Yantai (CN); Tengjiang Wang, Yantai (CN); Hongwei Dai, Yantai (CN); Yanle Liu, Yantai (CN); Yingying Sun, Yantai (CN); Peng Wang, Yantai (CN)

(73) Assignee: YANTAI UNIVERSITY, Yantai (CN)

( * ) Notice: Subject to any disclaimer, the term of this patent is extended or adjusted under 35 U.S.C. 154(b) by 0 days.

(21) Appl. No.: 19/061,523

(22) Filed: Feb. 24, 2025

Related U.S. Application Data (63) Continuation of application No. PCT/CN2024/126348, filed on Oct. 22, 2024.

Foreign Application Priority Data

Oct. 27, 2023 (CN) .......................... 202311401950.0

(51) Int. Cl.
*H04L 9/40* (2022.01)

(52) U.S. Cl.
CPC .............................. *H04L 63/1416* (2013.01)

(58) Field of Classification Search
CPC .................................................. H04L 63/1416
USPC .......................................................... 726/22
See application file for complete search history.

(56) References Cited

U.S. PATENT DOCUMENTS

| | | | |
|---|---|---|---|
| 11,418,526 B2* | 8/2022 | Bertiger | H04L 63/1425 |
| 11,734,384 B2* | 8/2023 | Kalantzis | G06N 20/00 |
| | | | 706/12 |
| 2015/0067857 A1* | 3/2015 | Symons | G06N 20/00 |
| | | | 726/23 |
| 2020/0336500 A1* | 10/2020 | Urmanov | H04L 63/0815 |

(Continued)

FOREIGN PATENT DOCUMENTS

| | | |
|---|---|---|
| CN | 113516249 A | 10/2021 |
| CN | 114595396 A | 6/2022 |

(Continued)

*Primary Examiner* — Badri Narayanan Champakesan
(74) *Attorney, Agent, or Firm* — Nitin Kaushik (57) ABSTRACT

The present invention belongs to the technical field of data security of industrial Internet, and provides a method and system for detecting abnormal nodes in industrial Internet, a medium and a device. In the industrial Internet, different data holders firstly transform their own local node data into graphic data. Before local model training, the data holders firstly use a spectral clustering algorithm to perform certain clustering operations on local data, cluster the node data of the same category into the same cluster, and then perform local model training on a clustered result to obtain partial aggregation features. The trained partial features are uploaded to a trusted third-party server for global feature aggregation. Through an attention mechanism, different weights are assigned for partial features uploaded by different data holders, and the aggregated global features are delivered to each data holder for a new round of training.

8 Claims, 2 Drawing Sheets

(56) References Cited

U.S. PATENT DOCUMENTS

| | | | |
|---|---|---|---|
| 2023/0098447 A1* | 3/2023 | Raza | G06F 9/505 |
| | | | 718/105 |
| 2023/0342426 A1* | 10/2023 | Kramer | G06F 18/24143 |
| 2023/0342428 A1* | 10/2023 | Kramer | G06N 3/088 |

FOREIGN PATENT DOCUMENTS

| | | |
|---|---|---|
| CN | 115567269 A | 1/2023 |
| CN | 116628554 A | 8/2023 |

* cited by examiner

METHOD AND SYSTEM FOR DETECTING ABNORMAL NODES IN INDUSTRIAL INTERNET, AND MEDIUM AND DEVICE

CROSS-REFERENCE TO RELATED APPLICATIONS

The application claims priority to Chinese patent application No. 202311401950.0, filed on Oct. 27, 2023, the entire contents of which are incorporated herein by reference.

TECHNICAL FIELD

The present invention belongs to the technical field of industrial network data security, and particularly relates to a method and system for detecting abnormal nodes in industrial Internet, and a medium and a device.

BACKGROUND

This statement merely provides background art information related to the present invention and does not necessarily constitute the prior art.

Detection of abnormal nodes in industrial Internet is to abstract local partial data of each data holder in the industrial Internet into graphic data and then detect abnormal nodes in the graphic data. The abnormal nodes in the industrial Internet of Things usually contain fraud, false and even harmful information that endangers the security of the industrial Internet, causing inestimable security accidents to user economy and platform development in the industrial Internet of Things. Therefore, detecting such abnormal nodes is of great significance for the healthy development of the industrial Internet.

With the development of the Industrial Internet of Things, various graphic data is also increasing, but the graphic data is controlled by different data holders, and it is very difficult to integrate all the graphic data. Besides, due to a privacy protection problem in the industrial Internet, it is not allowed to directly and universally load a large amount of the graphic data on GNN for training. As a new distributed machine learning paradigm, federated learning allows clients to collaborate in a decentralized way to train globally shared or personalized models without contributing their own local data. Such characteristic enables federated learning to be applied to the graphic data to mitigate data isolation problems and keep each client owning safe graphic data.

The inventor found that most traditional federation graph learning paradigms use FedAvg when the server performs client parameter aggregation. FedAvg can well achieve distributed GNN model training, but it does not consider the influence of partial parameters of different clients on weights of all client model training. In fact, during a process of federation graph learning, data parameters uploaded by each client have different influences, and it does not consider how to pre-process a large amount of data possessed by the clients. Therefore, there are errors in obtained detection results.

SUMMARY

In order to solve at least one technical problem existing in the above background art, the present invention provides a method and system for detecting abnormal nodes in industrial Internet, a medium and a device, which consider the influence of partial parameters of different clients on the weights of model training of all the clients. During an actual federation graph learning process, data parameters uploaded by each client have different influences, and during parameter aggregation, the server learns parameters of different clients to different degrees according to different weights, which improves the accuracy of detection results.

To achieve the above objective, the present invention adopts the following technical solutions:

A first aspect of the present invention provides a method for detecting abnormal nodes in industrial Internet, applied to the server, where the method includes the following steps:
  receiving partial feature parameters uploaded by different clients;
  assigning respective weights for the partial feature parameters uploaded by the different clients, performing global aggregation on the partial feature parameters on the basis of the weights to obtain global feature parameters, and delivering the global feature parameters to the clients participating in training;
  receiving a detection result of the nodes obtained by that the clients update local model training on the basis of the global feature parameters; and
  comparing the detection result of the nodes with a set threshold to obtain a risk level of abnormal nodes.

A second aspect of the present invention provides a method for detecting abnormal nodes in industrial Internet, applied to clients, where the method includes the following steps:
  clustering local node data sets to obtain partial feature parameters, and transmitting the partial feature parameters to a server;
  receiving the global feature parameters obtained by that the server performs global aggregation on the partial feature parameters;
  updating local model training according to the global feature parameters to obtain higher-order representation of different nodes, performing feature classification on the basis of the higher-order representation of different nodes to obtain a detection result of the nodes, and uploading the detection result of the nodes to the server; and
  receiving the risk level of the abnormal nodes delivered by the server.

A third aspect of the present invention provides a method for detecting abnormal nodes in industrial Internet, where the method includes the following steps:
  clustering local node data sets to obtain partial feature parameters, and transmitting the partial feature parameters to a server;
  receiving the partial feature parameters uploaded by different clients, assigning respective weights for the partial feature parameters uploaded by the different clients, performing global aggregation on the partial feature parameters on the basis of the weights to obtain global feature parameters, and delivering the global feature parameters to the clients participating in training;
  receiving the global feature parameters, updating local model training according to the global feature parameters to obtain higher-order representation of different nodes, performing feature classification on the basis of the higher-order representation of different nodes to obtain a detection result of the nodes, and uploading the detection result of the nodes to the server; and
  comparing the detection result of the nodes with a set threshold to obtain a risk level of abnormal nodes.

A fourth aspect of the present invention provides a system for detecting abnormal nodes in industrial Internet, applied to a server, where the system includes:
- a first receiving module, configured to receive partial feature parameters uploaded by different clients;
- a weight assigning module, configured to assign respective weights to the partial feature parameters uploaded by the different clients, and perform global aggregation on the partial feature parameters on the basis of the weights to obtain global feature parameters;
- a first delivering module, configured to deliver the global feature parameters to the clients participating in training; and
- a risk assessing module, configured to receive a detection result of the nodes obtained by that the clients update the local model training on the basis of the global feature parameters, and compare the detection result of the nodes with a set threshold to obtain a risk level of abnormal nodes.

A fifth aspect of the present invention provides a system for detecting abnormal nodes in industrial Internet, applied to the clients, where the system includes:
- a feature extracting module, configured to cluster local node data sets to obtain partial feature parameters;
- a second transmitting module, configured to transmit the partial feature parameters to the server;
- a node detecting module, configured to receive the global feature parameters obtained by that the server performs global aggregation on the partial feature parameters, update local model training according to the global feature parameters to obtain higher-order representation of different nodes, perform feature classification on the basis of the higher-order representation of different nodes to obtain a detection result of the nodes, and upload the detection result of the nodes to the server; and
- a second receiving module, configured to receive the risk level of the abnormal nodes delivered by the server, and perform respective node processing.

A sixth aspect of the present invention provides a system for detecting abnormal nodes in industrial Internet, where the system includes:
- a partial feature extracting module, configured to cluster local node data sets to obtain partial feature parameters, and transmit the partial feature parameters to a server;
- a global feature extracting module, configured to receive the partial feature parameters uploaded by different clients, assign respective weights to the partial feature parameters uploaded by the different clients, perform global aggregation on the partial feature parameters on the basis of the weights to obtain global feature parameters, and deliver the global feature parameters to the clients participating in training;
- a local module updating module, configured to receive the global feature parameters, update local model training according to the global feature parameters to obtain higher-order representation of different nodes, perform feature classification on the basis of the higher-order representation of different nodes to obtain a detection result of the nodes, and upload the detection result of the nodes to the server; and
- an abnormal node detecting module, configured to compare the detection result of the nodes with a set threshold to obtain a risk level of abnormal nodes.

A seventh aspect of the present invention provides a computer-readable storage medium.

A computer-readable storage medium with a computer program stored thereon, where when executed by a processor, the program implements the steps of the method for detecting abnormal nodes in industrial Internet in the first aspect or the second aspect or the third aspect.

An eighth aspect of the present invention provides a computer device.

The computer device includes a memory, a processor, and a computer program stored on the memory and executable on the processor, where the processor implements the steps of the method in the first aspect or the second aspect or the third aspect when executing the program.

Compared with the prior art, the present invention has the beneficial effects:

1. In the method for detecting abnormal nodes in industrial Internet based on federated graph neural network provided in the present invention, before training local partial data, the clients firstly use a spectral clustering algorithm to perform a pre-processing operation on local data sets, aggregate nodes with similar features into a unified cluster, aggregate remaining nodes into other clusters, and combine cluster information of the nodes with the feature information to obtain aggregated data sets for the next step of processing. A pre-processing operation for local data can add additional auxiliary information to nodes, improve the precision of local model training, and reduce the burden of parameter aggregation on a server.

2. In the present invention, on the basis of aggregated data sets, the clients locally use a GNN model for training to obtain node feature aggregation parameters, and use a differential privacy policy to upload the partial parameters of the clients to the server for aggregation. The server receives the partial parameters from different clients, and assign different aggregation weights for different parameters according to client training results through an attention mechanism, such that the clients with good training effects drive the clients with poor training effects, thus achieving better overall training effects, then obtaining high-order neighbor features with richer feature information to perform the next step of classification detection, improving the accuracy of detection results, evaluating the risk level according to the detection results, and being favorable for maintaining the security of the industrial Internet.

BRIEF DESCRIPTION OF THE DRAWINGS

The accompanying drawings of the specification which constitute a part of the present invention provide further understanding of the present invention. The schematic embodiments of the present invention and description thereof are intended to explain the present invention and are not intended to constitute an improper limit to the present invention.

DETAILED DESCRIPTION OF THE EMBODIMENTS

The present invention is described in more detail with reference to the accompanying drawings and embodiments.

It should be noted that the following detailed description is exemplary and aims to further describe the present invention. Unless otherwise specified, all technical and scientific terms used herein have the same meanings as those generally understood by a person of ordinary skill in the art to which the present invention belongs.

It should be noted that the terms used herein are only for describing the embodiments rather than for limiting the exemplary embodiments of the present invention. As used herein, unless otherwise stated clearly in the context, a singular form is intended to include a plural form thereof. In addition, it should be understood that the terms "comprise" and/or "include" as used herein indicate the presence of features, steps, operations, components, assemblies, and/or combinations thereof.

The present invention has an overall idea: firstly, in the industrial Internet, different data holders firstly transform their own local node data into graphic data. Before local model training, the data holders firstly use a spectral clustering algorithm to perform certain clustering operations on local data, cluster the node data of the same category into the same cluster, and then perform local model training on a clustered result to obtain better partial aggregation features. Secondly, the trained partial features are uploaded to a trusted third-party server for global feature aggregation. Through an attention mechanism, the server assigns different weights for partial features uploaded by different data holders, and then the aggregated global features are delivered to each data holder for a new round of training. Therefore, abnormal nodes are classified from normal nodes, besides, different risk levels of the abnormal nodes are obtained, and industrial Internet managers can immediately take different measures to maintain data security of the industrial Internet.

Embodiment I

Figure 1:
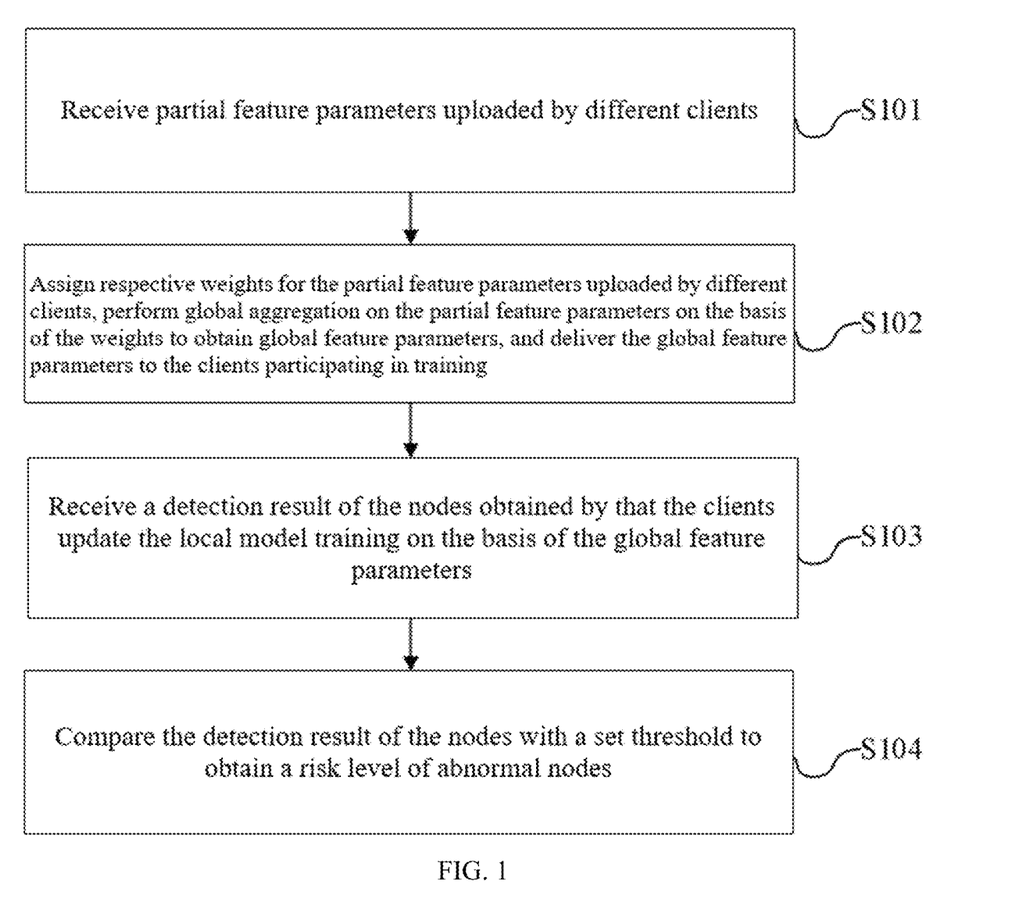
FIG. 1 is a flowchart of a method for detecting abnormal nodes in industrial Internet, applied to a server, according to an embodiment of the present invention.

FIG. 1 is a flowchart of a method for detecting abnormal nodes in industrial Internet, applied to a server, as shown in FIG. 1, the embodiment provides the method for detecting abnormal nodes in industrial Internet, applied to the server, where the method includes the following steps:

S101: partial feature parameters uploaded by different clients are received;

S102: respective weights are assigned to the partial feature parameters uploaded by different clients, global aggregation is performed on the partial feature parameters on the basis of the weights to obtain global feature parameters, and the global feature parameters are delivered to the clients participating in training;

S103: a detection result of the nodes obtained by that the clients update the local model training on the basis of the global feature parameters is received; and S104: the detection result of the nodes is compared with a set threshold to obtain a risk level of abnormal nodes.

Further, in S102, the server assigns, through an adaptive attention mechanism according to the training efficiency of the partial parameters, different weights for the partial parameters uploaded by different clients, higher weights are assigned for the parameters with better training effects, on the contrary, lower weights are assigned for the parameters with poor training effects, and in this way, the clients with better training effects can drive the clients with poor training effects.

The server aggregates, through the attention mechanism, parameters uploaded by the clients, through the attention mechanism, different aggregation weights are assigned for the parameters uploaded by each client according to the contribution degree to server aggregation, after obtaining aggregation parameters of different weights, the server aggregates, through different weight parameters, parameters uploaded by the current client and other clients, an objective function can be represented as:

$$\begin{cases} Z_{C_1} = \alpha_1 Z_1 + \alpha_2 Z_2 + \ldots + \alpha_n Z_n \\ Z_{C_2} = \beta_1 Z_1 + \beta_2 Z_2 + \ldots + \beta_n Z_n \\ \vdots \\ Z_{C_n} = \delta_1 Z_1 + \delta_2 Z_2 + \ldots + \delta_n Z_n \end{cases}$$

where $C_i$, i=(1, 2, . . . , n) represents the number of n clients participating in federated training, $Z_i$, i=(1, 2, . . . , n) is to receive partial aggregation parameters which are not uploaded by clients, $Z_{ci}$, i=(1, 2, . . . , n) is global parameters aggregated by the server for $C_i$ clients, and $\alpha_i, \beta_i, \ldots, \delta_i$, i=(1, 2, . . . , n) is a set of aggregation parameters obtained by the server for different clients through the attention mechanism.

In this process, the server will perform weighting processing on the aggregation parameters $\alpha_i, \beta_i, \ldots, \delta_i$, i=(1, 2, . . . , n) obtained by different clients and partial feature parameters $Z_i$, i=(1, 2, . . . , n) uploaded by target clients and other clients, to obtain the global parameters $Z_{ci}$, i=(1, 2, . . . , n) of the target clients.

Through such mechanism, the clients with good training effects can possess parameters with large weights during aggregation, to drive the clients with poor training effects, and thus improving the overall training effects. Even if each client has the same training effects, the server will shift to a weighted average aggregation strategy.

S104: the detection result of the nodes is compared with a set threshold to obtain a risk level of abnormal nodes.

After obtaining the detection result of the nodes, it is also necessary to execute different processing for different node attributes. If the nodes are normal in the node attributes, it is only necessary to periodically detect the target nodes and repeat the operations of S101-S105. In this embodiment, the detection period is 15 days;

if the nodes are abnormal in the node attributes, a feature difference between the abnormal nodes and the normal nodes is judged, and the security risk level of the abnormal nodes is assessed according to the feature difference between the abnormal nodes and the normal nodes, specifically:

if the feature difference between the abnormal nodes and the normal nodes is less than a first threshold, the risk level of the corresponding abnormal nodes is determined to be a first risk level;

if the feature difference between the abnormal nodes and the normal nodes is not less than the first threshold and is not greater than a second threshold, the risk level of the corresponding abnormal nodes is determined to be a second risk level; and if the feature difference between the abnormal nodes and the normal nodes is greater than the second threshold, the risk level of the corresponding abnormal nodes is determined to be a third risk level.

In the embodiment, the first threshold is 0.15, and the second threshold is 0.4.

It is also necessary to judge detection result attributes of the nodes and assess the risk level:

if the nodes are normal in the detection result attributes of the nodes, it is only necessary to periodically maintain and inspect the normal nodes;

if the nodes are abnormal in the detection result attributes of the nodes, it is necessary to process the abnormal nodes according to the risk level, specifically:

if the abnormal level of the nodes is the first risk level, only the corresponding nodes are inspected every two days, and the risk level is periodically assessed;

if the abnormal level of the nodes is the second risk level, only interaction of part of the neighbor information is open to the corresponding nodes, the target nodes are inspected every day, and the risk level is assessed periodically; and if the abnormal level of the nodes is the third risk level, information interaction between the corresponding node and other nodes is prohibited, the information of the node is reported to an administrator, and the node is removed from the industrial Internet of Things.

Herein, in the embodiment, the range of the first risk level is 0-0.15, and the range of the second risk level is 0.15-0.4; if the risk level is greater than 0.4, it is judged as the third risk level; and the first risk level is a low risk, the second risk level is a medium risk, and the third risk level is a high risk.

Embodiment II

Figure 2:
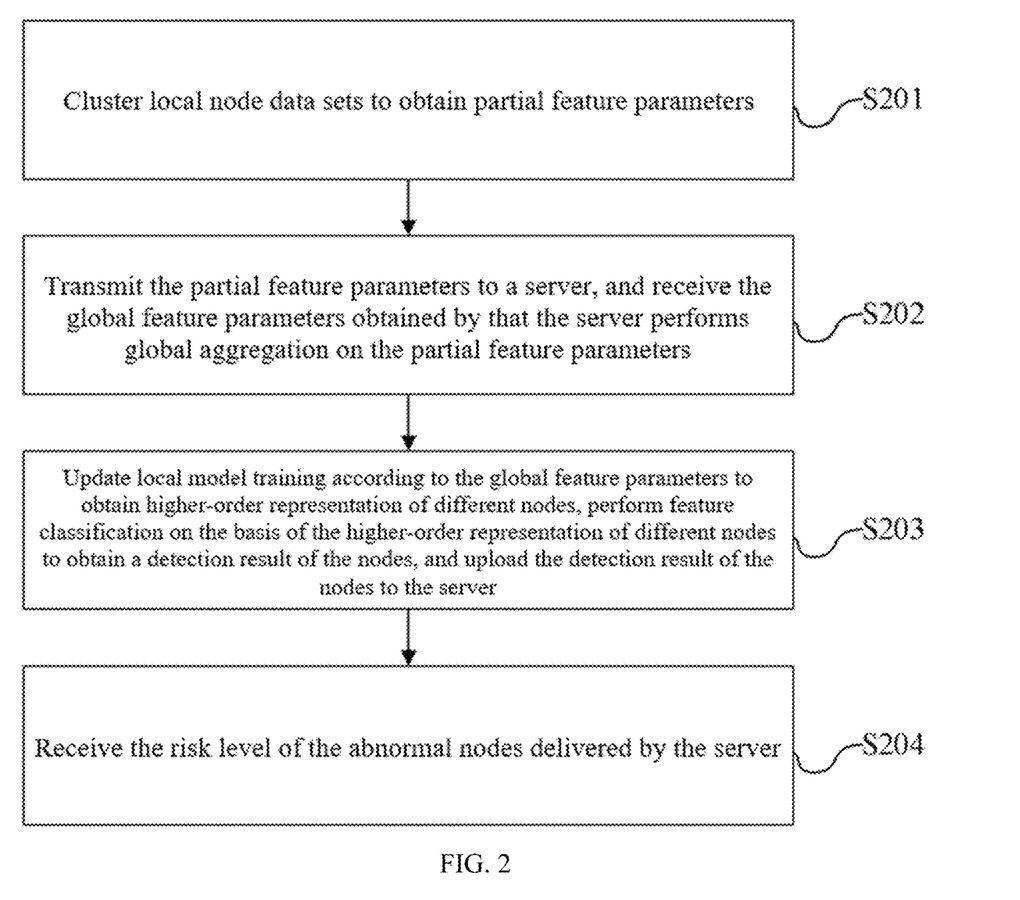
FIG. 2 is a flowchart of a method for detecting abnormal nodes in industrial Internet, applied to clients, according to an embodiment of the present invention.

FIG. 2 is a flowchart of a method for detecting abnormal nodes in industrial Internet, applied to clients, as shown in FIG. 2, the embodiment provides the method for detecting abnormal nodes in industrial Internet, applied to clients, where the method includes the following steps:

S201: local node data sets are clustered to obtain partial feature parameters;

S202: the partial feature parameters are transmitted to a server, and the global feature parameters obtained by that the server performs global aggregation on the partial feature parameters are received;

S203: local model training is updated according to the global feature parameters to obtain higher-order representation of different nodes, feature classification is performed on the basis of the higher-order representation of different nodes to obtain a detection result of the nodes, and the detection result of the nodes is uploaded to the server; and S204: the risk level of the abnormal nodes delivered by the server is received.

In S201, local node data sets are clustered to obtain partial feature parameters, which specifically includes:

S201: the local node data sets are transformed into graphic data, and on the basis of the graphic data, an initial adjacency matrix of target data node sets is obtained;

where data holders in industrial interconnection neaten their own node data, and the node data sets include but are not limited to information of various devices and the relationship between the devices, forming an initial node data set $D_i$, (i=1,2,3 . . . , n), where i is the number of different data holders.

The data holders obtain initial graphic data after graph construction and processing according to their node data sets $D_i$. $G_i$ represents the initial graphic data of the $i_{th}$ data holder, where G=(V,E,X), V is a set V={$v_1, v_2, \ldots, v_n$} of N nodes, E is a set of edges, X={$x_1, x_2, \ldots, x_n$} represents a feature matrix of the nodes, and $x_i$ is an eigenvector of the node $v_i$. The initial graphic data is constructed and processed through an adjacency matrix to obtain an initial adjacency matrix.

S202: a clustering operation is performed on the obtained initial adjacency matrix by using a spectral clustering algorithm, nodes which are close in distances are aggregated into a cluster and nodes which are far in distances are aggregated into another cluster to obtain an initial clustered result set, and feature processing is performed on the clustered result set to obtain the partial feature parameters.

In S202, the clients regard owned industrial Internet data nodes as points in space, which can be connected by false edges, where weights between the nodes which are close in distances are high, and weights between the nodes which are far in distances are low.

S2021: firstly, a similarity matrix W is constructed, and a distance between two sample points is calculated by using a Euclidean distance; all the sample points are traversed by using a KNN algorithm, k points closest to each sample are taken as a neighbor, only $w_{ij}>0$ among the k points that are closest to the sample while only two points are k neighbors to each other, $w_{ij}$ is retained, the similarity matrix W is constructed in this way; an objective function can be represented as:

$$w_{ii} = w_{ji} = \begin{cases} 0 & g_i \notin KNN(g_i) \text{ or } g_j \notin KNN(g_i) \\ \exp\left(-\frac{\|g_i - g_j\|_2^2}{2\sigma^2}\right) & g_i \in KNN(g_j) \text{ and } g_j \in KNN(g_i) \end{cases},$$

Where $\|g_i-g_j\|_2^2$ is a Euclidean distance between the two sample points, $\sigma$ is a scale parameter, and w changes along with changes of a $\sigma$ value.

S2022: a degree matrix D is constructed, for two sample points $g_i$ and $g_j$ which are related, $w_{ij}>0$, for two sample points $g_i$ and $g_j$ which are not related, $w_{ij}=0$, and therefore for any one sample point $g_i$ in a set, the degree $d_i$ of the sample point can be defined as the sum of all the weights associated with a target sample point. The degree matrix D can be obtained by using the definition of the degree of each sample point, D is a diagonal matrix, and only a main diagonal has a value.

S2023: a Laplacian matrix and a standardized Laplacian matrix are constructed by using the constructed similarity matrix W and the constructed degree matrix D, the Laplacian matrix L and the standardized Laplacian matrix $\tilde{L}$ are calculated, the objective function can be represented as:

$$L = D - W, \tilde{L} = D^{-\frac{1}{2}}LD^{-\frac{1}{2}} = D^{-\frac{1}{2}}(D-W)D^{-\frac{1}{2}} = I - \tilde{W},$$

where L is the Laplacian matrix, and $\tilde{L}$ is the standardized Laplacian matrix. Eigenvalues of $\tilde{L}$ are calculated, the eigenvalues are sorted from small to large, first k eigenvalues are taken, eigenvectors of the eigenvalues are calculated, the k eigenvectors form a matrix U=($u_1, u_2, \ldots, u_k$), and U∈$R^{n*k}$ forms a new solution space. Clustering is performed on the new solution space by using a K-means algorithm, and then a clustered result is mapped to an original solution space to be used as an input for the next task.

Finally, feature processing is performed by using a graph convolutional network (GCN) to obtain partial feature parameters, the objective function can be represented as:

$$H^{(l+1)} = \sigma\left(\tilde{D}^{-\frac{1}{2}}\tilde{A}\tilde{D}^{-\frac{1}{2}}H^{(l)}W^{(l)}\right),$$

where $H^{(1)}$ is a representation matrix of nodes in an l layer, $W^{(I)}$ is a trainable parameter matrix, $\tilde{A}=A+I_N$ represents an adjacency matrix containing self-connection, and σ represents a nonlinear activation function.

The gradient of a model trained by the clients is solved by using a loss function, to be used as a partial aggregation feature parameter to be uploaded to the server.

In S202, when the partial feature parameters are transmitted to the server, in this process, in order to protect security of data and prevent security influence caused by data leakage, the trained partial parameters adopt a global differential privacy strategy, and instead of adding noise to each data node separately, the overall result is subjected to noise addition processing after function calculation is completed, which can achieve higher accuracy and lower noise level. At the same time, true uploaded parameter information is hidden to prevent security problems caused by the data leakage.

In S203, a process of updating local model training according to the global feature parameters includes:

in first federated training, own local data sets are preprocessed by using the spectral clustering algorithm, then the model is trained by using the GCN, and the trained gradient, as a partial aggregation parameter, is uploaded to the server.

In the embodiment, the local aggregation parameters are uploaded to the server by using the global differential privacy strategy.

The clients continue to perform local model training according to the updated parameters, which is an iterative process. In order to obtain better training effects, multiple iterative training processes are generally performed to obtain the best training effects. This process keeps looping, the number of rounds of loops is set to 30, and then the best result is selected from the results of each round of training.

In S203, feature classification is performed on the basis of higher-order representation of different nodes to obtain detection results of the nodes.

In the embodiment, high-order neighbor features are processed by using a semi-supervised node classification method, the high-order neighbor features are classified by using a softmax activation function, a predicted node label Z is outputted, Z is represented in a matrix form, and values in the matrix are only 0 and 1, where 0 represents the normal nodes and 1 represents the abnormal nodes.

Embodiment III

The embodiment provides a method for detecting abnormal nodes in industrial Internet, where the method includes the following steps:

clustering local node data sets to obtain partial feature parameters, and transmitting the partial feature parameters to a server;

receiving the partial feature parameters uploaded by different clients, assigning respective weights for the partial feature parameters uploaded by the different clients, performing global aggregation on the partial feature parameters on the basis of the weights to obtain global feature parameters, and delivering the global feature parameters to the clients participating in training;

receiving the global feature parameters, updating local model training according to the global feature parameters to obtain higher-order representation of different nodes, performing feature classification on the basis of the higher-order representation of different nodes to obtain a detection result of the nodes, and uploading the detection result of the nodes to the server; and comparing the detection result of the nodes with a set threshold to obtain a risk level of abnormal nodes.

Embodiment IV

The embodiment provides a system for detecting abnormal nodes in industrial Internet, applied to a server, where the system includes:

a first receiving module, configured to receive partial feature parameters uploaded by different clients;

a weight assigning module, configured to assign respective weights to the partial feature parameters uploaded by the different clients, and perform global aggregation on the partial feature parameters on the basis of the weights to obtain global feature parameters;

a first delivering module, configured to deliver the global feature parameters to the clients participating in training; and a risk assessing module, configured to receive a detection result of the nodes obtained by that the clients update the local model training on the basis of the global feature parameters, and compare the detection result of the nodes with a set threshold to obtain a risk level of abnormal nodes.

Embodiment V

The embodiment provides an apparatus for detecting abnormal nodes in industrial Internet, applied to clients, where the system includes:

a feature extracting module, configured to cluster local node data sets to obtain partial feature parameters;

a second transmitting module, configured to transmit the partial feature parameters to the server;

a node detecting module, configured to receive the global feature parameters obtained by that the server performs global aggregation on the partial feature parameters, update local model training according to the global feature parameters to obtain higher-order representation of different nodes, perform feature classification on the basis of the higher-order representation of different nodes to obtain a detection result of the nodes, and upload the detection result of the nodes to the server; and a second receiving module, configured to receive the risk level of the abnormal nodes delivered by the server, and perform respective node processing.

Embodiment VI

The embodiment provides a system for detecting abnormal nodes in industrial Internet, including:

a partial feature extracting module, configured to cluster local node data sets to obtain partial feature parameters, and transmit the partial feature parameters to a server;

a global feature extracting module, configured to receive the partial feature parameters uploaded by different clients, assign respective weights to the partial feature parameters uploaded by the different clients, perform global aggregation on the partial feature parameters on the basis of the weights to obtain global feature parameters, and deliver the global feature parameters to the clients participating in training;

a local module updating module, configured to receive the global feature parameters, update local model training according to the global feature parameters to obtain higher-order representation of different nodes, perform feature classification on the basis of the higher-order representation of different nodes to obtain a detection result of the nodes, and upload the detection result of the nodes to the server; and an abnormal node detecting module, configured to compare the detection result of the nodes with a set threshold to obtain a risk level of abnormal nodes.

Embodiment VII

The embodiment provides a computer-readable storage medium with a computer program stored thereon, when executed by a processor, the program implements the steps of the method for detecting abnormal nodes in industrial Internet as described above.

Embodiment VIII

The embodiment provides a computer device, including a memory, a processor, and a computer program stored on the memory and executable on the processor, where when executing the program, the processor implements the steps of the method for detecting abnormal nodes in industrial Internet as described above.

The foregoing is merely illustrative of the preferred embodiments of the present invention and is not intended to limit the present invention, and various changes and modifications may be made by those skilled in the art. Any modifications, equivalent replacements, improvements, and the like made within the spirit and principle of the present invention shall fall within the protection scope of the present invention.

What is claimed is:

1. A method for detecting abnormal nodes in industrial Internet, comprising the following steps:

clustering local node data sets to obtain partial feature parameters, and transmitting the partial feature parameters to a server, wherein the clustering local node data sets to obtain partial feature parameters specifically comprises: transforming the local node data sets into graphic data, and on the basis of the graphic data, obtaining an initial adjacency matrix of target data node sets;

performing a clustering operation on the obtained initial adjacency matrix by using a spectral clustering algorithm, according to a set distance range, aggregating corresponding nodes in a first distance range into a cluster and aggregating corresponding nodes outside the first distance range into another cluster to obtain an initial clustered result set, and performing feature processing on the initial clustered result set to obtain the partial feature parameters;

clients regarding owned industrial Internet data nodes as points in space, which are connected by false edges, wherein weights between the nodes which are close in distances are high, and weights between the nodes which are far in distances are low;

specifically: constructing a similarity matrix W, and calculating a distance between two sample points by using a Euclidean distance; constructing a degree matrix D;

constructing a Laplacian matrix L and a standardized Laplacian matrix IL by using the constructed similarity matrix W and the constructed degree matrix D, calculating eigenvalues of L, sorting the calculated eigenvalues from small to large, taking first k eigenvalues, calculating the eigenvectors to form a new solution space, and after performing clustering by using a K-means algorithm, mapping results back to an original solution space;

performing feature processing by using a graph convolutional network to obtain partial feature parameters;

receiving the partial feature parameters uploaded by different clients, assigning respective weights for the partial feature parameters uploaded by the different clients, performing global aggregation on the partial feature parameters on the basis of the weights to obtain global feature parameters, and delivering the global feature parameters to the clients participating in training; the assigning respective weights to the partial feature parameters uploaded by the different clients, and performing global aggregation on the partial feature parameters on the basis of the weights comprise: through an attention mechanism, assigning different aggregation weights to the partial feature parameters uploaded by each client according to the contribution degree to server aggregation, after obtaining aggregation parameters of different weights, performing weighting processing on the partial feature parameters uploaded by the current client and rest clients through different weight parameters to obtain the global feature parameters;

receiving the global feature parameters, updating local model training according to the global feature parameters to obtain higher-order representation of different nodes, performing feature classification on the basis of the higher-order representation of different nodes to obtain a detection result of the nodes, and uploading the detection result of the nodes to the server; and comparing the detection result of the nodes with a set threshold to obtain a risk level of abnormal nodes; and receiving partial feature parameters uploaded by different clients; assigning respective weights for the partial feature parameters uploaded by the different clients, performing global aggregation on the partial feature parameters on the basis of the weights to obtain global feature parameters, and delivering the global feature parameters to the clients participating in training; and receiving a detection result of the nodes obtained by that the clients update local model training on the basis of the global feature parameters; and comparing the detection result of the nodes with a set threshold to obtain a risk level of abnormal nodes.

2. The method for detecting abnormal nodes in industrial Internet according to claim 1, wherein the comparing the detection result of the nodes with a set threshold to obtain a risk level of abnormal nodes comprises:

executing different processing for different node attributes, if the node attributes are normal nodes, periodically detecting target nodes, and if the node attributes are abnormal nodes, assessing a security risk level of the abnormal nodes according to a feature difference between the abnormal nodes and the normal nodes.

3. The method for detecting abnormal nodes in industrial Internet according to claim 1, applied to the clients, wherein the method comprises the following steps:

clustering local node data sets to obtain partial feature parameters, and transmitting the partial feature parameters to a server;

receiving the global feature parameters obtained by that the server performs global aggregation on the partial feature parameters;
updating local model training according to the global feature parameters to obtain higher-order representation of different nodes, performing feature classification on the basis of the higher-order representation of different nodes to obtain a detection result of the nodes, and uploading the detection result of the nodes to the server; and
receiving the risk level of the abnormal nodes delivered by the server.

4. A system for detecting abnormal nodes in industrial Internet comprising a memory, adopting the method for detecting abnormal nodes in industrial Internet according to claim 1, applied to the server, wherein the system comprises: a first receiving module, configured to receive partial feature parameters uploaded by different clients; a weight assigning module, configured to assign respective weights to the partial feature parameters uploaded by the different clients, and perform global aggregation on the partial feature parameters on the basis of the weights to obtain global feature parameters; a first delivering module, configured to deliver the global feature parameters to the clients participating in training; and a risk assessing module, configured to receive a detection result of the nodes obtained by that the clients update the local model training on the basis of the global feature parameters, and compare the detection result of the nodes with a set threshold to obtain a risk level of abnormal nodes.

5. A system for detecting abnormal nodes in industrial Internet comprising a memory, adopting the method for detecting abnormal nodes in industrial Internet according to claim 3, applied to the clients, wherein the system comprises: a feature extracting module, configured to cluster local node data sets to obtain partial feature parameters; a second transmitting module, configured to transmit the partial feature parameters to the server; a node detecting module, configured to receive the global feature parameters obtained by that the server performs global aggregation on the partial feature parameters, update local model training according to the global feature parameters to obtain higher-order representation of different nodes, perform feature classification on the basis of the higher-order representation of different nodes to obtain a detection result of the nodes, and upload the detection result of the nodes to the server; and a second receiving module, configured to receive the risk level of the abnormal nodes delivered by the server, and perform respective node processing.

6. A system for detecting abnormal nodes in industrial Internet comprising a memory, adopting the method for detecting abnormal nodes in industrial Internet according to claim 1, wherein the system comprises: a partial feature extracting module, configured to cluster local node data sets to obtain partial feature parameters, and transmit the partial feature parameters to a server; a global feature extracting module, configured to receive the partial feature parameters uploaded by different clients, assign respective weights to the partial feature parameters uploaded by the different clients, perform global aggregation on the partial feature parameters on the basis of the weights to obtain global feature parameters, and deliver the global feature parameters to the clients participating in training; a local module updating module, configured to receive the global feature parameters, update local model training according to the global feature parameters to obtain higher-order representation of different nodes, perform feature classification on the basis of the higher-order representation of different nodes to obtain a detection result of the nodes, and upload the detection result of the nodes to the server; and an abnormal node detecting module, configured to compare the detection result of the nodes with a set threshold to obtain a risk level of abnormal nodes.

7. A non-transitory computer-readable storage medium with a computer program stored thereon, wherein when executed by a processor, the program implements the steps of the method for detecting abnormal nodes in industrial Internet according to claim 1.

8. A computer device, comprising a memory, a processor, and a computer program stored on the memory and executable on the processor, wherein when executing the program, the processor implements the steps of the method for detecting abnormal nodes in industrial Internet according to claim 1.

* * * * *